United States Patent
Lin

(10) Patent No.: US 11,115,171 B2
(45) Date of Patent: *Sep. 7, 2021

(54) METHOD FOR DETERMINING LENGTH OF FEEDBACK RESPONSE INFORMATION AND RELATED PRODUCT

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/021,700

(22) Filed: Sep. 15, 2020

(65) Prior Publication Data

US 2020/0412489 A1 Dec. 31, 2020

Related U.S. Application Data

(63) Continuation of application No. 16/703,286, filed on Dec. 4, 2019, now abandoned, which is a continuation
(Continued)

(30) Foreign Application Priority Data

Aug. 9, 2017 (WO) ................ PCT/CN2017/096656

(51) Int. Cl.
*H04W 4/00* (2018.01)
*H04L 5/00* (2006.01)
(Continued)

(52) U.S. Cl.
CPC .......... *H04L 5/0055* (2013.01); *H04L 1/1812* (2013.01); *H04L 1/1854* (2013.01);
(Continued)

(58) Field of Classification Search
CPC ... H04L 1/1812; H04L 1/1854; H04L 1/1864; H04W 72/04
(Continued)

(56) References Cited

U.S. PATENT DOCUMENTS 8,493,873 B2 7/2013 Malladi
8,670,396 B2 3/2014 Luo
(Continued)

FOREIGN PATENT DOCUMENTS

CN 101547077 A 9/2009
CN 101771502 A 7/2010
(Continued)

OTHER PUBLICATIONS

CATT (HARQ and scheduling timing design for LTE sTTI, China, May 15-19, 2017, R1-1707446) (Year: 2017).*
(Continued)

*Primary Examiner* — Maharishi V Khirodhar

(57) ABSTRACT

A novel approach to determining a length of a feedback response is provided. A method comprises the following steps: a terminal receives configuration signaling sent by a network side device, the configuration signaling comprising: indicating the maximum transmission timing value of feedback response information. The terminal dynamically determines a hybrid automatic repeat request feedback time sequence, and determines the total number of bits of a feedback response message to be transmitted according to the maximum transmission timing value. The terminal sends the feedback response message to be transmitted with the total number of bits to the network side device.

17 Claims, 6 Drawing Sheets

Related U.S. Application Data of application No. PCT/CN2018/081785, filed on Apr. 3, 2018.

(51) Int. Cl.
   *H04L 1/18* (2006.01)
   *H04W 28/04* (2009.01)
   *H04W 72/04* (2009.01)

(52) U.S. Cl.
   CPC .......... *H04L 1/1864* (2013.01); *H04L 5/0094* (2013.01); *H04W 28/04* (2013.01); *H04W 72/04* (2013.01)

(58) Field of Classification Search
   USPC ......................................................... 370/329
   See application file for complete search history.

(56) References Cited

U.S. PATENT DOCUMENTS

| | | | |
|---|---|---|---|
| 9,184,869 | B2 | 11/2015 | Han |
| 9,716,569 | B2 | 7/2017 | Larsson et al. |
| 9,762,356 | B2 | 9/2017 | Rudolf et al. |
| 9,893,846 | B2 | 2/2018 | Yu et al. |
| 10,595,166 | B2 | 3/2020 | Yin et al. |
| 10,715,280 | B2 | 7/2020 | Hu et al. |
| 10,873,437 | B2 | 12/2020 | Yin et al. |
| 10,999,864 | B2 | 5/2021 | Zhang et al. |
| 2011/0228731 | A1 | 9/2011 | Luo |
| 2013/0044667 | A1 | 2/2013 | Han |
| 2014/0362832 | A1 | 12/2014 | Rudolf et al. |
| 2015/0333878 | A1 | 11/2015 | Yu et al. |
| 2016/0248551 | A1 | 8/2016 | Larsson et al. |
| 2017/0331595 | A1 | 11/2017 | Rudolf et al. |
| 2018/0020335 | A1 | 1/2018 | Yin et al. |
| 2018/0048451 | A1 | 2/2018 | Yin et al. |
| 2018/0077719 | A1* | 3/2018 | Nory ................. H04W 28/0278 |
| 2018/0145815 | A1 | 5/2018 | Takeda et al. |
| 2018/0310290 | A1* | 10/2018 | Shimezawa ......... H04W 72/044 |
| 2019/0116616 | A1* | 4/2019 | Si ........................... H04L 5/0055 |
| 2019/0273581 | A1* | 9/2019 | Zhu ....................... H04L 1/1819 |
| 2019/0296863 | A1 | 9/2019 | Hu et al. |
| 2019/0306878 | A1 | 10/2019 | Zhang et al. |
| 2020/0127794 | A1* | 4/2020 | Lin ....................... H04W 72/12 |
| 2020/0145140 | A1* | 5/2020 | Lee ........................ H04L 1/1819 |
| 2020/0205192 | A1 | 6/2020 | Zhang et al. |
| 2020/0313807 | A1 | 10/2020 | Salem |

FOREIGN PATENT DOCUMENTS

| | | |
|---|---|---|
| CN | 101958775 A | 1/2011 |
| CN | 102237982 A | 11/2011 |
| CN | 102647261 A | 8/2012 |
| CN | 102687414 A | 9/2012 |
| CN | 102870388 A | 1/2013 |
| CN | 104254995 A | 12/2014 |
| CN | 104380645 A | 2/2015 |
| CN | 106899396 A | 6/2017 |
| CN | 110351018 A | 10/2019 |
| RU | 2514089 C2 | 4/2014 |
| WO | 2007084065 A2 | 7/2007 |
| WO | 2014000221 A1 | 1/2014 |
| WO | 2016208726 A1 | 12/2016 |
| WO | 2017078782 A1 | 5/2017 |
| WO | 2017131374 A1 | 8/2017 |
| WO | 2019075693 A1 | 4/2019 |
| WO | 2020197195 A1 | 10/2020 |

OTHER PUBLICATIONS

CATT (R1-1707446), "HARQ and scheduling timing design for LTE sTTI", China, May 15-19, 2017 (Year: 2017).*

International Search Report in the international application No. PCT/CN2018/085678, dated Jul. 18, 2018.

English translation of the Written Opinion of the International Search Authority in the international application No. PCT/CN2018/085678, dated Jul. 18, 2018.

International Search Report in the international application No. PCT/CN2017/096656, dated Apr. 16, 2018.

English translation of the Written Opinion of the International Search Authority in the international application No. PCT/CN2017/096656, dated Apr. 16, 2018.

International Search Report in the international application No. PCT/CN2018/081785, dated Jun. 27, 2018.

English translation of the Written Opinion of the International Search Authority in the international application No. PCT/CN2018/081785, dated Jun. 27, 2018.

Ericsson, 3GPP TSG RAN1 WG1 Meeting #91, R1-1721013, on HARQ Management, Dec. 1, 2017 (Dec. 1, 2017), sections 1-4.

Catt., 3GPP TSG RAN WG1 Meeting #87, R1-1611394, NR UL Control Channel Structure, Nov. 18, 2016 (Nov. 18, 2016), entire document.

Guangdong Oppo Mobile Telecom., 3GPP TSG RAN WG1 meeting #89, R1-1707726, on Symbol-Level Time-Domain Resource Allocation, May 19, 2017 (May 19, 2017), entire document.

Ericsson, 3GPP TSG RAN WG1 #89, R1-1709102, on Fixed HARQ Codebook Design, May 19, 2017 (May 19, 2017), entire document.

Catt: "HARQ and scheduling timing design for LTE sTTI ", 3GPP Draft; R1-1707446, 3RD Generation Partnership Project (3GPP), Mobile Competence Centre ; 650, Route Des Lucioles; F-06921 Sophia-Antipolis Cedex; France, vol. Ran WG1, No. Hangzhou; May 15, 2017-May 19, 2017, May 14, 2017 (May 14, 2017), XP051272655, Retrieved from the Internet: URL: http://www.3gpp.org/ftp/Meetings_3GPP_SYNC/RAN1/Docs/[ retrieved on May 14, 2017] *Section "Dynamic codebook size"*; p. 4; figure 3.

Ericsson: "On HARQ Codebook", 3GPP Draft; R1-1711510, 3RD Generation Partnership Project (3GPP), Mobile Competence Centre; 650, Route Des Lucioles; F-06921 Sophia-Antipolis Cedex; France, vol. RAN WG1, No. Qingdao, China; Jun. 27, 2017-Jun. 30, 2017, Jun. 17, 2017 (Jun. 17, 2017), XP051305638, Retrieved from the Internet: URL: http://ww.3gpp. org/ftp/tsg_ran/WG1_RL1/TSGR1_AH/NR_AH_1706/Docs/ [ retrieved on-Jun. 17, 2017]* the whole document*.

Supplementary European Search Report in the European application No. 18843899.8, dated Jun. 9, 2020.

Nokia, Alcatel-Lucent Shanghai Bell, "On HARQ feedback determination", 3GPP TSG RAN WG1 NR Ad-Hoc #2 R1-1710999, Qingdao, P.R. China, Jun. 27-20, 2017.

Huawei, HiSilicon, "On HARQ-ACK multiplexing and/or bundling", 3GPP TSG RAN WG1 NR Ad Hoc Meeting R1-1710462, Qingdao, China, Jun. 27-30, 2017.

Samsung, "HARQ-ACK codebook determination", 3GPP TSG RAN WG1 NR Ad-Hoc#2, R1-1710729, Qingdao, P.R. China Jun. 27-30, 2017.

Supplementary European Search Report in the European application No. 18845148.8, dated Jun. 9, 2020.

First Office Action of the Chinese application No. 201911342791.5, dated Nov. 2, 2020.

First Office Action of the European application No. 18845148.8, dated Feb. 3, 2021.

First Office Action of the Chilean application No. 201903914, dated Mar. 16, 2021.

Office Action of the Indian application No. 201917049701, dated Mar. 23, 2021.

First Office Action of the European application No. 18843899.8, dated Feb. 3, 2021.

First Office Action of the Chinese application No. 201911348552.0, dated May 8, 2021.

First Office Action of the Canadian application No. 3066673, dated May 14, 2021.

First Office Action of the Russian application No. 2019144638, dated Jul. 5, 2021.

NTT Docomo, Inc., "HARQ/Scheduling timing for shortened processing time for 1ms TTI", 3GPP TSG RAN WG1 Meeting #89 R1-1708408, Hangzhou, P.R. China May 15-19, 2017.

(56) References Cited

OTHER PUBLICATIONS

Nokia, Alcatel-Lucent Shanghai Bell, "On HARQ feedback determination", 3GPP TSG RAN WG1#89 R1-1708527, Hangzhou, P.R. China, May 15-19, 2017.

Huawei, HiSilicon, "HARQ processing time", 3GPP TSG RAN WG1 NR Ad-Hoc Meeting R1-1709964, Qingdao, China, Jun. 27-30, 2017.

Ericsson, "On UE processing time and scheduling complexity", 3GPP TSG RAN WG1 NR Ad-Hoc#2 R1-1711367, Qingdao, P.R. China, Jun. 27-30, 2017.

Ericsson, "On Minimum Processing Time and Number of HARQ Processes in NR", 3GPP TSG RAN WG1 NR Ad-Hoc#2 R1-1711511, Qingdao, P.R. China, Jun. 27-30, 2017.

Pre-Interview Communication of the U.S. Appl. No. 16/619,431, dated Jun. 24, 2021.

\* cited by examiner

METHOD FOR DETERMINING LENGTH OF FEEDBACK RESPONSE INFORMATION AND RELATED PRODUCT

CROSS-REFERENCE TO RELATED APPLICATIONS

The application is a continuation of U.S. patent application Ser. No. 16/703,286 filed on Dec. 4, 2019, which is a continuation application of International Application No. PCT/CN2018/081785 filed on Apr. 3, 2018, which claims priority to PCT Application No. PCT/CN2017/096656, filed to the China Patent Bureau on Aug. 9, 2017, and entitled "Method for Determining Length of Feedback Response Information and Related Product", the contents of which are hereby incorporated by reference in their entireties.

TECHNICAL FIELD

The disclosure relates to the technical field of communication, and more particularly to a method for determining a length of feedback response information and a related product.

BACKGROUND

Hybrid Automatic Repeat request (HARQ) integrates storage, retransmission requesting and merging demodulation. That is, a receiving party, in case of a decoding failure, stores received data and requests a sending party for data retransmission, and the receiving party combines retransmitted data with the previously received data and decode the combined data.

A new radio (NR) system supports dynamic indication of HARQ timing. In a technical solution of HARQ timing, a length (i.e., number of bits) of an Acknowledgement (ACK)/Negative Acknowledgement (NACK) fed back within one transmission time unit (for example, one slot) is unable to be determined. Therefore, multiplexing transmission of an ACK/NACK is unable to be supported in an existing NR system.

BRIEF DESCRIPTION OF DRAWINGS

The drawings required to be used for descriptions about the embodiments or a conventional art will be simply introduced below.

DETAILED DESCRIPTION

The technical solutions in the embodiments of the disclosure will be described below in combination with the drawings.

Figure 1:
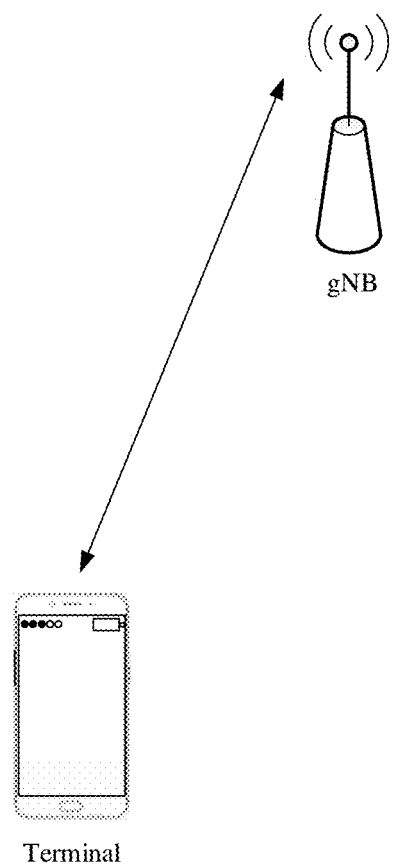
FIG. 1 is a structure diagram of an exemplary communication system.

Referring to FIG. 1, FIG. 1 is a possible network architecture of an exemplary communication system according to an embodiment of the disclosure. The exemplary communication system may be a 5th-Generation (5G) NR communication system, and specifically includes a network-side device and a terminal. When the terminal accesses a mobile communication network provided by the network-side device, the terminal may establish a communication connection with the network-side device through a radio link. Such a communication connection manner may be a single-connection manner or a dual-connection manner or a multi-connection manner. However, when the communication connection manner is the single-connection manner, the network-side device may be a Long Term Evolution (LTE) base station or an NR Node B (NR-NB) (also called a gNB). When the communication manner is the dual-connection manner (which may specifically be implemented by a Carrier Aggregation (CA) technology or implemented by multiple network-side devices) and the terminal is connected with multiple network-side devices, the multiple network-side devices may include a Master Cell Group (MCG) and Secondary Cell Groups (SCGs), data is transmitted back between the cell groups through backhauls, the MCG may be an NR-NB and the SCGs may be LTE base stations.

In the embodiments of the disclosure, terms "network" and "system" are often used alternately and their meanings may be understood by those skilled in the art. A terminal involved in the embodiments of the disclosure may include various handheld devices, vehicle-mounted devices, wearable devices, computing devices or other processing devices connected to wireless modems, which have a wireless communication function, as well as User Equipment (UE), Mobile Stations (MSs), terminal devices and the like in various forms. For convenient description, the devices mentioned above are collectively referred to as terminals.

Figure 2:
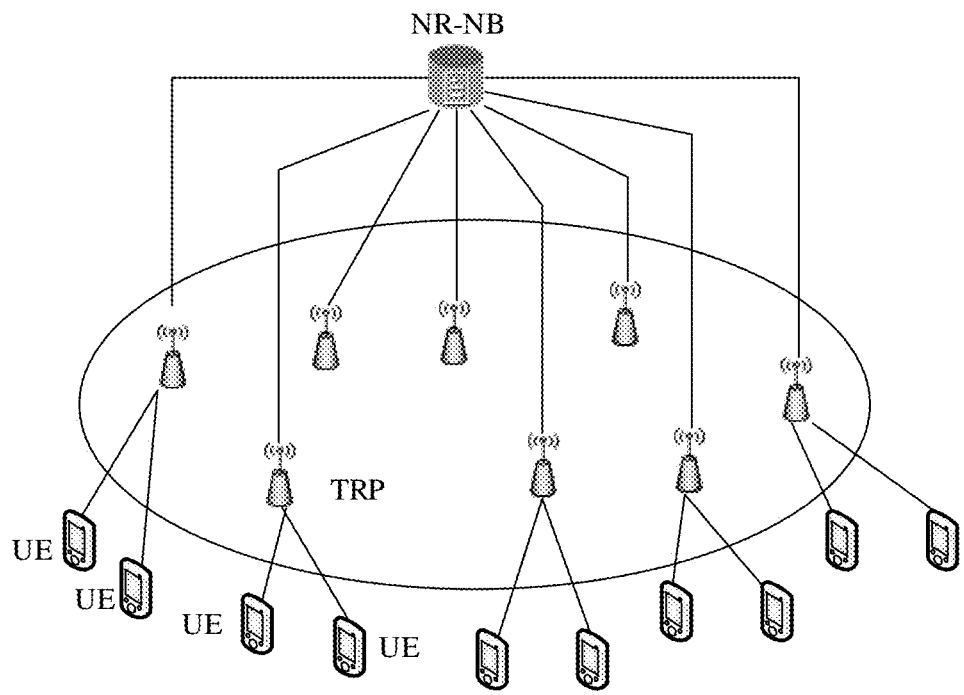
FIG. 2 is a structure diagram of an exemplary NR communication system.
Figure 2A:
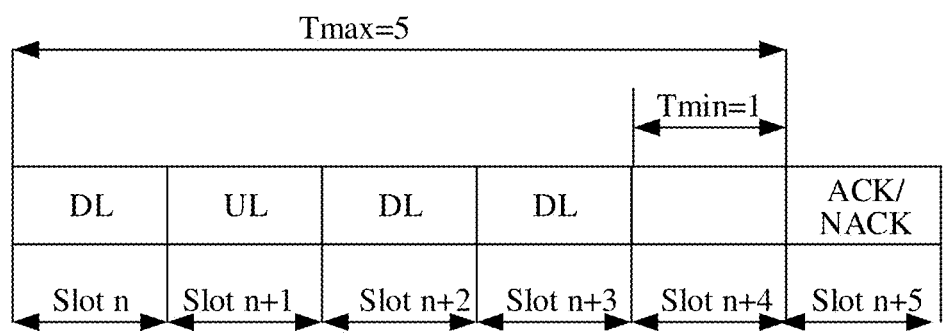
FIG. 2A is a schematic diagram of an exemplary transmission time unit.

Referring to FIG. 2, FIG. 2 is a structure diagram of a 5G NR network. As illustrated in FIG. 2, there may be one or more Transmission Reception Points (TRPs) in an NR-NB, and there may be one or more terminals within a range of the one or more TRPs. In an NR system illustrated in FIG. 2, for Downlink (DL) data, a terminal needs to feed back to the gNB through HARQ whether the DL data is successfully received, i.e., the terminal is required to feed back a HARQ ACK/NACK to the gNB. In the NR system, HARQ timing of ACK/NACK feedback information for data (mainly the DL data) may be dynamically indicated by the gNB, and the following transmission time unit is, for example, a slot. Referring to FIG. 2A, FIG. 2A is a schematic diagram of a transmission time unit for HARQ timing in an NR system. There may be made such a hypothesis that the HARQ timing is indicated in a slot n. As illustrated in FIG. 2A, there is made such a hypothesis that the HARQ timing may be five slots, and in the five slots, the slot n carries DL data for DL transmission, the slot n+1 carries UL data for UL transmission, the slot n+2 carries DL data, the slot n+3 carries DL data, the slot n+4 is empty and the slot n+5 is a slot through which the terminal feeds back an ACK/NACK to the gNB. Since both the slot n+2 and the slot n+3 carry the DL data, the ACK/NACK corresponding to the slot n+2 and the ACK/NACK corresponding to the slot n+3 are also required to be fed back. For example, if the gNB dynamically indicates that HARQ timing for the ACK/NACK corresponding to the slot n+2 is three slots and HARQ timing for the ACK/NACK corresponding to the slot n+3 is two slots, there are ACK/NACKs of the slots for the slot n+5, namely multiplexing transmission of the ACKs/NACKs of the three slots is required to be performed in the slot n+5. The terminal in the NR system illustrated in FIG. 2 cannot implement multiplexing transmission of the ACKs/NACKs of the three slots in the slot n+5.

Embodiments of the disclosure provide a method for determining a length of feedback response information and a related product, which may implement multiplexing transmission of an ACK/NACK in an NR system.

According to a first aspect, the embodiments of the disclosure provide a method for determining a length of feedback response information, which may include the following operations.

A terminal receives configuration signaling sent by a network-side device. The configuration signaling includes an indication about a maximum transmission timing value for feedback response information.

The terminal dynamically determines an HARQ feedback timing.

The terminal determines a total number of bits of feedback response information to be transmitted according to the maximum transmission timing value.

The terminal sends the feedback response information to be transmitted with the total number of bits to the network-side device.

In at least one embodiment, the operation that the terminal determines the total number of bits of the feedback response information to be transmitted according to the maximum transmission timing value may include the following action.

The terminal determines the total number of bits of the feedback response information to be transmitted according to the maximum transmission timing value and a minimum transmission timing value.

In at least one embodiment, the operation that the terminal determines the total number of bits of the feedback response information to be transmitted according to the maximum transmission timing value may include the following action.

The terminal determines the total number of bits of the feedback response information to be transmitted according to a difference between the maximum transmission timing value and the minimum transmission timing value.

In at least one embodiment, the operation that the terminal determines the total number of bits of the feedback response information to be transmitted according to the maximum transmission timing value may include the following action.

The total number of bits $N=C*(T_{max}-T_{min})$, where $T_{max}$ may be the maximum transmission timing value, $T_{min}$ may be a nonnegative integer less than $T_{max}$, and C may be a positive integer.

In at least one embodiment, the operation that the terminal determines the total number of bits of the feedback response information to be transmitted according to the maximum transmission timing value may include the following action.

The terminal determines the total number of bits of the feedback response information to be transmitted according to the maximum transmission timing value, a minimum transmission timing value and $M_{non-DL}$, $M_{non-DL}$ being a value less than the maximum transmission timing value.

In at least one embodiment, the operation that the terminal determines the total number of bits of the feedback response information to be transmitted according to the maximum transmission timing value may include the following action.

The terminal determines the total number of bits of the feedback response information to be transmitted according to a value obtained by subtracting the minimum transmission timing value and $M_{non-DL}$ from the maximum transmission timing value. $M_{non-DL}$ is a value less than the maximum transmission timing value.

In at least one embodiment, the operation that the terminal determines the total number of bits of the feedback response information to be transmitted according to the maximum transmission timing value may include the following action.

The total number of bits $N=C*(T_{max}-T_{min}-M_{non-DL})$, where $T_{max}$ may be the maximum transmission timing value, $T_{min}$ and $M_{non-DL}$ may be nonnegative integers less than $T_{max}$, and C may be a positive integer.

In at least one embodiment, $T_{min}$ may be the minimum transmission timing value for feedback response information transmission of the terminal, or $T_{min}$ may be a parameter configured by the network-side device.

In at least one embodiment, C may be a maximum number of bits of feedback response information corresponding to a physical downlink shared channel (PDSCH), or C may be a set constant, or C may be a parameter configured by the network-side device.

In at least one embodiment, $M_{non-DL}$ may be the number of all first-type time units between a transmission time unit $Y-T_{max}$ and a transmission time unit $Y-T_{min}$, and a transmission time unit Y is a time unit for transmission of the feedback response information to be transmitted.

In at least one embodiment, the first-type time unit may include at least one of an uplink (UL) time unit, a time unit when the terminal performs no transmission of a physical shared channel, or a time unit when the terminal does not monitor downlink (DL) control signaling.

In at least one embodiment, the maximum number of bits of the feedback response information corresponding to the PDSCH may be: a maximum number of transport blocks (TBs) carried in the PDSCH; or a maximum number of code block (CB) groups carried in the PDSCH.

In at least one embodiment, the operation that the terminal sends the feedback response information to be transmitted with the total number of bits to the base station may include one of the following actions.

The terminal jointly codes the feedback response information and sends the coded feedback response information.

The terminal sends the feedback response information through a physical channel.

A second aspect provides a terminal, which may include a processing unit and a transceiver unit connected with the processing unit.

The transceiver unit may be configured to receive configuration signaling sent by a network-side device. The configuration signaling includes an indication about a maximum transmission timing value for feedback response information.

The processing unit may be configured to dynamically determine an HARQ feedback timing and determine a total number of bits of feedback response information to be transmitted according to the maximum transmission timing value.

The transceiver unit may be configured to send the feedback response information to be transmitted with the total number of bits to the network-side device.

In at least one embodiment, the processing unit may be configured to determine the total number of bits of the feedback response information to be transmitted according to the maximum transmission timing value and a minimum transmission timing value.

In at least one embodiment, the processing unit may be configured to determine the total number of bits of the feedback response information to be transmitted according to a difference between the maximum transmission timing value and the minimum transmission timing value.

In at least one embodiment, the processing unit may be configured to determine the total number of bits of the feedback response information to be transmitted according to the maximum transmission timing value, the total number of bits $N=C*(T_{max}-T_{min})$.

$T_{max}$ may be the maximum transmission timing value, $T_{min}$ may be a nonnegative integer less than $T_{max}$, and C may be a positive integer.

In at least one embodiment, the processing unit may be configured to determine the total number of bits of the feedback response information to be transmitted according to the maximum transmission timing value, a minimum transmission timing value and $M_{non-DL}$. $M_{non-DL}$ is a value less than the maximum transmission timing value.

In at least one embodiment, the processing unit may be configured to determine the total number of bits of the feedback response information to be transmitted according to a value obtained by subtracting the minimum transmission timing value and $M_{non-DL}$ from the maximum transmission timing value. $M_{non-DL}$ is a value less than the maximum transmission timing value.

In at least one embodiment, the processing unit may be configured to determine the total number of bits of the feedback response information to be transmitted according to the maximum transmission timing value, the total number of bits $N=C*(T_{max}-T_{min}-M_{non-DL})$.

$T_{max}$ may be the maximum transmission timing value, $T_{min}$ and $M_{non-DL}$ may be nonnegative integers less than $T_{max}$, and C may be a positive integer.

In at least one embodiment, $T_{min}$ may be the minimum transmission timing value for feedback response information transmission of the terminal, or $T_{min}$ may be a parameter configured by the network-side device.

In at least one embodiment, C may be a maximum number of bits of feedback response information corresponding to a PDSCH, or C may be a set constant, or C may be a parameter configured by the network-side device.

In at least one embodiment, $M_{non-DL}$ may be the number of all first-type time units between a transmission time unit $Y-T_{max}$ and a transmission time unit $Y-T_{min}$, and a transmission time unit Y is a time unit for transmission of the feedback response information to be transmitted.

In at least one embodiment, the first-type time unit may include at least one of a UL time unit, a time unit when the terminal performs no transmission of a physical shared channel, or a time unit when the terminal does not monitor DL control signaling.

In at least one embodiment, the maximum number of bits of the feedback response information corresponding to the PDSCH may be: a maximum number of TBs carried in the PDSCH; or a maximum number of CB groups carried in the PDSCH.

In at least one embodiment, the transceiver unit may be configured to jointly code the feedback response information and send the coded feedback response information, or the transceiver unit may be configured to send the feedback response information through a physical channel.

A third aspect provides a method for determining a length of feedback response information, which may include the following operations.

A network-side device sends configuration signaling to a terminal. The configuration signaling includes an indication about a maximum transmission timing value for feedback response information.

The network-side device determines an HARQ feedback timing dynamically determined by the terminal.

The network-side device determines a total number of bits of feedback response information to be transmitted according to the maximum transmission timing value.

The network-side device receives the feedback response information to be transmitted with the total number of bits from the terminal.

In at least one embodiment, the operation that the network-side device determines the total number of bits of the feedback response information to be transmitted according to the maximum transmission timing value may include the following action.

The network-side device determines the total number of bits of the feedback response information to be transmitted according to the maximum transmission timing value and a minimum transmission timing value.

In at least one embodiment, the operation that the network-side device determines the total number of bits of the feedback response information to be transmitted according to the maximum transmission timing value may include the following action.

The network-side device determines the total number of bits of the feedback response information to be transmitted according to a difference between the maximum transmission timing value and the minimum transmission timing value.

In at least one embodiment, the operation that the network-side device determines the total number of bits of the feedback response information to be transmitted according to the maximum transmission timing value may include the following action.

The total number of bits $N=C*(T_{max}-T_{min})$, where $T_{max}$ may be the maximum transmission timing value, $T_{min}$ may be a nonnegative integer less than $T_{max}$, and C may be a positive integer.

In at least one embodiment, the operation that the network-side device determines the total number of bits of the feedback response information to be transmitted according to the maximum transmission timing value may include the following action.

The network-side device determines the total number of bits of the feedback response information to be transmitted according to the maximum transmission timing value, the minimum transmission timing value and $M_{non-DL}$. $M_{non-DL}$ is a value less than the maximum transmission timing value.

In at least one embodiment, the operation that the network-side device determines the total number of bits of the feedback response information to be transmitted according to the maximum transmission timing value may include the following action.

The network-side device determines the total number of bits of the feedback response information to be transmitted according to a value obtained by subtracting the minimum transmission timing value and $M_{non-DL}$ from the maximum transmission timing value, where $M_{non-DL}$ is a value less than the maximum transmission timing value.

In at least one embodiment, the operation that the network-side device determines the total number of bits of the feedback response information to be transmitted according to the maximum transmission timing value may include the following action.

The total number of bits $N=C*(T_{max}-T_{min}-M_{non-DL})$. $T_{max}$ may be the maximum transmission timing value, $T_{min}$ and $M_{non-DL}$ may be nonnegative integers less than $T_{max}$, and C may be a positive integer.

In at least one embodiment, $T_{min}$ may be the minimum transmission timing value for feedback response information transmission of the terminal, or $T_{min}$ may be a parameter configured by the network-side device.

In at least one embodiment, C may be a maximum number of bits of feedback response information corresponding to a PDSCH, or C may be a set constant, or C may be a parameter configured by the network-side device.

In at least one embodiment, $M_{non-DL}$ may be the number of all first-type time units between a transmission time unit $Y-T_{max}$ and a transmission time unit $Y-T_{min}$, and a transmission time unit Y is a time unit for transmission of the feedback response information to be transmitted.

In at least one embodiment, the first-type time unit may include at least one of a UL time unit, a time unit when the terminal performs no transmission of a physical shared channel, or a time unit when the terminal does not monitor DL control signaling.

In at least one embodiment, the maximum number of bits of the feedback response information corresponding to the PDSCH may be: a maximum number of TBs carried in the PDSCH; or a maximum number of CB groups carried in the PDSCH.

In at least one embodiment, the operation that the network-side device receives the feedback response information to be transmitted with the total number of bits from the terminal may include the following actions.

The network-side device receives the feedback response information subjected to joint coding from the terminal, or the network-side device receives the feedback response information sent by the terminal through a physical channel.

A fourth aspect provides a network-side device, which may include a processing unit and a transceiver unit connected with the processing unit.

The transceiver unit may be configured to send configuration signaling to a terminal. The configuration signaling includes an indication about a maximum transmission timing value for feedback response information.

The processing unit may be configured to determine an HARQ feedback timing dynamically determined by the terminal and determine a total number of bits of feedback response information to be transmitted according to the maximum transmission timing value.

The transceiver unit may be configured to receive the feedback response information to be transmitted with the total number of bits from the terminal.

A fifth aspect provides a terminal, which may include one or more processors, a memory, a transceiver and one or more programs. The one or more programs may be stored in the memory and configured to be executed by the one or more processors, and the programs may include instructions configured to execute operations of the method provided in the first aspect.

A sixth aspect provides a computer-readable storage medium, which may store a computer program for electronic data exchange. The computer program enables a computer to execute the method provided in the first aspect.

A seventh aspect provides a computer program product, which may include a non-transitory computer-readable storage medium having a computer program stored thereon. The computer program is operated to enable a computer to execute the method provided in the first aspect.

An eighth aspect provides a network device, which may include one or more processors, a memory, a transceiver and one or more programs. The one or more programs may be stored in the memory and configured to be executed by the one or more processors, and the programs may include instructions configured to execute operations of the method provided in the first aspect.

A ninth aspect provides a computer-readable storage medium, which may store a computer program for electronic data exchange. The computer program enables a computer to execute the method provided in the second aspect.

A tenth aspect provides a computer program product, which may include a non-transitory computer-readable storage medium having a computer program stored thereon. The computer program is operated to enable a computer to execute the method provided in the second aspect.

In the embodiments of the disclosure, the terminal receives the maximum transmission timing value sent by a base station, calculates a length of the feedback response information to be transmitted according to the maximum transmission timing value and sends the feedback response information with the length to the base station. Therefore, multiplexing transmission of an ACK/NACK within a transmission time unit may be supported by an NR system, and the advantage of supporting multiplexing transmission of the feedback response information in the NR system is achieved.

Figure 3:
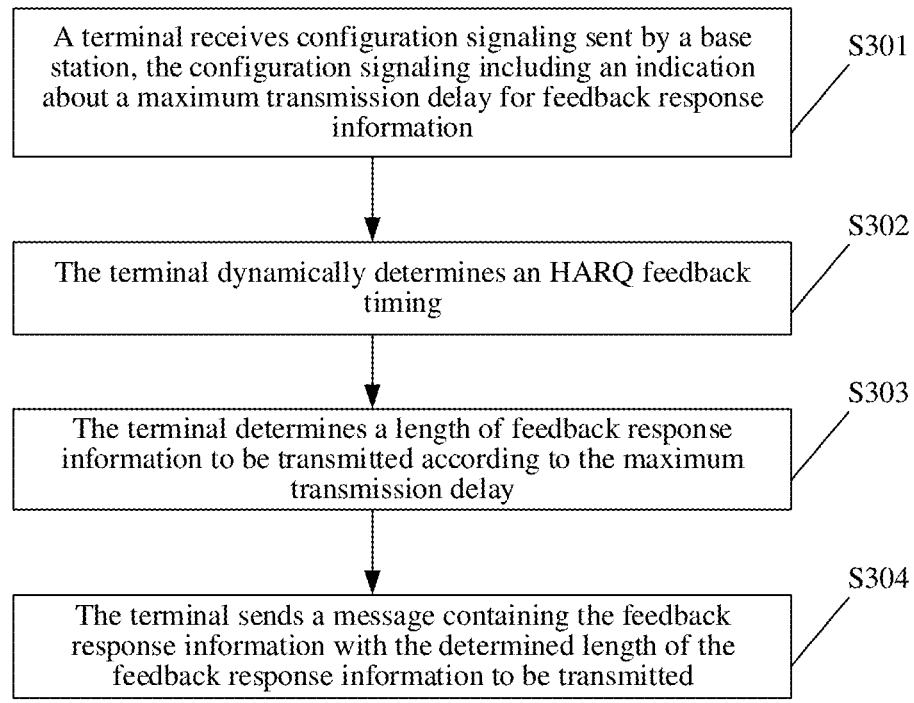
FIG. 3 is a schematic diagram of a method for determining a length of feedback response information according to an embodiment of the disclosure.

Referring to FIG. 3, FIG. 3 illustrates a method for determining a length of feedback response information according to an embodiment of the disclosure. The method is executed by a terminal. As illustrated in FIG. 3, the method includes the following operations.

In S301, the terminal receives configuration signaling sent by a network-side device (for example, a base station). The configuration signaling may include an indication about a maximum transmission delay for feedback response information.

The configuration signaling in S301 may be transmitted by scheduling a PDSCH. Specifically, the maximum transmission delay may be indicated in a DL grant for scheduling the PDSCH. A transmission time unit is, for example, a slot. There is made such a hypothesis that a first transmission time unit is a slot n, and the maximum transmission delay may be the number of slots. Specifically, the maximum transmission delay may be, for example, k1, and then k1 is indicated in a DL grant, scheduling the PDSCH, of the slot n.

In S302, the terminal dynamically determines an HARQ feedback timing.

An implementation method for S302 may specifically be as follows. The terminal parses the configuration signaling to obtain the maximum transmission delay, a transmission time unit delayed by the maximum transmission delay from the first transmission time unit for reception of the configuration signaling is a transmission time unit for HARQ feedback response information. Here, the transmission time unit is also, for example, a slot. If the configuration signaling is carried in a slot n for transmission and the maximum transmission delay corresponding to the configuration signaling is k1, the determined HARQ feedback timing is k1, and the transmission time unit for the HARQ feedback response information may be slot n+k1.

In S303, the terminal determines a length (i.e., a total number of bits) of feedback response information to be transmitted according to the maximum transmission delay.

In at least one embodiment, the terminal determines the total number of bits of the feedback response information to be transmitted according to the maximum transmission delay and a minimum transmission delay.

In at least one embodiment, the terminal determines the total number of bits of the feedback response information to be transmitted according to a difference between the maximum transmission delay and the minimum transmission delay.

In at least one embodiment, the terminal determines the total number of bits of the feedback response information to be transmitted according to the maximum transmission delay, the minimum transmission delay and $M_{non-DL}$. $M_{non-DL}$ is a value less than the maximum transmission delay.

In at least one embodiment, the terminal determines the total number of bits of the feedback response information to be transmitted according to a value obtained by subtracting the minimum transmission delay and $M_{non-DL}$ from the maximum transmission delay, and $M_{non-DL}$ is a value less than the maximum transmission delay.

In S304, the terminal sends a message containing the feedback response information with the determined length of the feedback response information to be transmitted.

An implementation method for the operation in S304 may specifically be as follows.

The terminal sends the feedback response information subjected to a joint coding.

Or the terminal sends the feedback response information through a physical channel.

According to the technical solution provided in the embodiment illustrated in FIG. 3, a base station, when scheduling a PDSCH transmission, indicates the maximum transmission delay in a DL grant for scheduling the PDSCH of the first transmission time unit, and the terminal, after receiving the first transmission time unit, acquires the maximum transmission delay, calculates the length of the HARQ feedback response information according to the maximum transmission delay and sends the HARQ feedback response information with the length to the base station, so that multiplexing transmission of an ACK/NACK in a transmission time unit is supported in an NR system.

A technical effect achieved by the embodiment will be described below with an example. The transmission time unit illustrated in FIG. 2A is sent in the NR illustrated in FIG. 2. Herein, there is made such a hypothesis that each transmission time unit includes two TBs. If the terminal successfully receives the slot n and the slot n+2 and the terminal does not receive the slot n+3, for the existing NR system, feedback response information in the slot n+5 may be 1111. In the existing NR system, if the terminal does not successfully receive the data of the slot, no corresponding response may be fed back, so that the terminal may not contain the HARQ feedback response information corresponding to the slot n+3 in the slot n+5, and the base station may not recognize, according to 1111, that the terminal does not receive the slot n+3. Therefore, the base station cannot accurately obtain the HARQ feedback response information of the terminal for subsequent operations, for example, data retransmission is unable to be performed according to the HARQ feedback response information. According to the technical solution illustrated in FIG. 3, the terminal receives configuration information in the slot n, and the configuration information includes the maximum transmission delay of 5 slots. The terminal determines according to the maximum transmission delay that the total number of bits of the HARQ feedback response information is 6 (the specific method for determining the total number of bits may refer to the following descriptions and will not be elaborated herein), then the terminal sends the 6 bit HARQ feedback response information in the slot n+5 and may specifically send 111100. The base station may learn according to allocation of slots for DL data that the slot n and the slot n+2 are successfully transmitted and the slot n+3 is failed to be transmitted, thereby achieving the advantage that multiplexing transmission of an ACK/NACK in a transmission time unit is supported in the NR system.

In at least one embodiment, an implementation method for the operation in S303 may specifically be as follows.

The length, i.e., the total number of bits N, of the feedback response information is calculated according to the following formula (1).

$$N=C*(T_{max}-T_{min}) \qquad (1).$$

C may be a positive integer, $T_{max}$ may be the maximum transmission delay, and $T_{min}$ may be a nonnegative integer not greater than $T_{max}$.

$T_{min}$ may be the minimum transmission delay for transmission of the feedback response information by the terminal. Of course, $T_{min}$ may also be a parameter configured by the network-side device, and the parameter may be a fixed value. During a practical application, a value of $T_{min}$ may also be contained in the configuration signaling.

C may be a maximum number of bits of feedback response information corresponding to a PDSCH, or C may be a set constant (i.e., a value specified in a protocol or a value predetermined by a manufacturer), or C may be a parameter configured by the network-side device.

The maximum number of bits of the feedback response information corresponding to the PDSCH may specifically be: a maximum number of TBs carried in the PDSCH; or a maximum number of CB groups carried in the PDSCH.

Figure 3A:
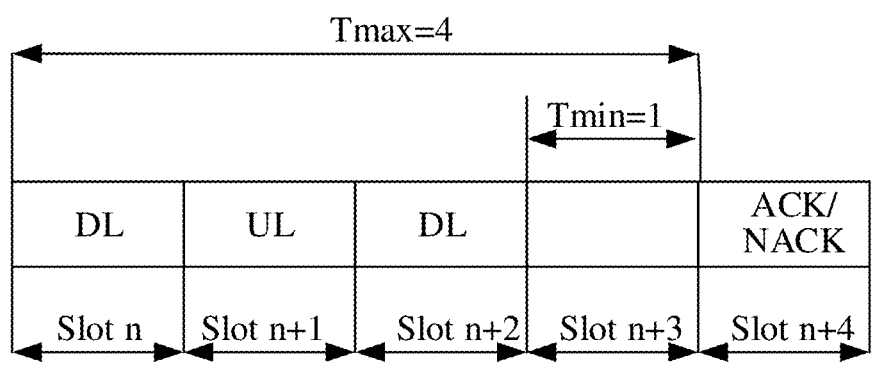
FIG. 3A is a schematic diagram of a transmission time unit according to an embodiment of the disclosure.

For example, the maximum number of the TBs carried in a slot of the PDSCH may be 2 (the number is only for exemplary description and a specific value of the number is not limited in the disclosure), this does not mean that each slot includes two TBs, and in a practical application scenario, the slot may include one TB or no TB (for example, the slot n+4 illustrated in FIG. 2A). The number of the CB groups carried in a slot of the PDSCH may be 4 (the number is only for exemplary description and a specific value of the number is not limited in the disclosure), and similarly, this also does not mean that each slot includes four CB groups. A method for determining a value of N will be described below with an example. Referring to FIG. 3A, the configuration signaling may be contained in the slot n, the maximum transmission delay in the configuration signaling is 4 slots, and the minimum transmission delay in the configuration signaling is one slot. There is made such a hypothesis that a total number of basic units for the feedback response information in each slot is two. The basic unit for the feedback response information is, for example, a TB. Of course, during a practical application, the basic unit for the feedback response information may also be a CB group, and the CB group includes at least one CB. The value is determined to be 6 (bits) according to N=2*(4−1)=6 calculated by using the formula (1).

The above technical solution does not distinguish whether the feedback response information between $T_{max}$ and $T_{min}$ is needed to be fed back to the base station. As illustrated in FIG. 3A, the slot n+1 may be used to carry UL data, and for the slot n+1, no feedback response information is needed to be transmitted to the base station. In the technical solution, the feedback response information corresponding to the slot n+1 may be filled with a specific numerical value (for example, 1 or 0), and the base station only needs to identify the feedback response information corresponding to the slot n and the slot n+2, and may discard or not process the feedback response information corresponding to the slot n+1.

In at least one embodiment, the implementation method for the operation in S303 may specifically be as follows.

The length, i.e., the total number of bits N, of the feedback response information is calculated according to the following formula (2).

$$N=C*(T_{max}-T_{min}-M_{non-DL}) \qquad (2).$$

$T_{min}$ and $M_{non-DL}$ may be nonnegative integers, N is a nonnegative value, and meanings of C and $T_{max}$ may refer to the descriptions in the formula (1).

In at least one embodiment, $M_{non-DL}$ may be the number of all first-type time units between a transmission time unit $Y-T_{max}$ and a transmission time unit $Y-T_{min}$, and a transmission time unit Y is a transmission time unit for transmission of the feedback response information.

The first-type time unit may specifically include, but not limited to, one or any combination of a UL time unit, a time unit when the terminal performs no transmission of a physical shared channel and a time unit when the terminal does not monitor DL control signaling.

In the embodiment of the disclosure, in addition to determining the length of the feedback response information by using the formula (1) and formula (2), another implementation manner may also be adopted to determine the length of the feedback response information according to the maximum transmission delay and the minimum transmission delay, or another implementation manner is adopted to determine the length of the feedback response information according to the maximum transmission delay, the minimum transmission delay and $M_{non-DL}$. For simplicity, elaborations are omitted herein.

The method for determining the value of N will be described below with an example. Referring to FIG. 3A, the configuration signaling may be contained in the slot n, the maximum transmission delay in the configuration signaling is four slots, the minimum transmission delay in the configuration signaling is one slot, and a UL time unit between a slot Y−4 and a slot Y−1 is the slot n+1, so $M_{non-DL}=1$. There is made such a hypothesis that the total number of the basic units for the feedback response information in each slot is 2. Herein, the basic unit for the feedback response information is, for example, a TB. During a practical application, the basic unit for the feedback response information may also be a CB group, and the CB group includes at least one CB. The value is determined to be 4 (bits) according to N=2*(4−1−1)=4 calculated by using the formula (2).

The above technical solution distinguishes whether the feedback response information between $T_{max}$ and $T_{min}$, is required to be fed back to the base station. As illustrated in FIG. 3A, the slot n+1 may be used carry UL data, and for the slot n+1, no feedback response information is needed to be transmitted to the base station. According to the technical solution, information of the slot n+1 is not fed back in the feedback response information.

Figure 3B:
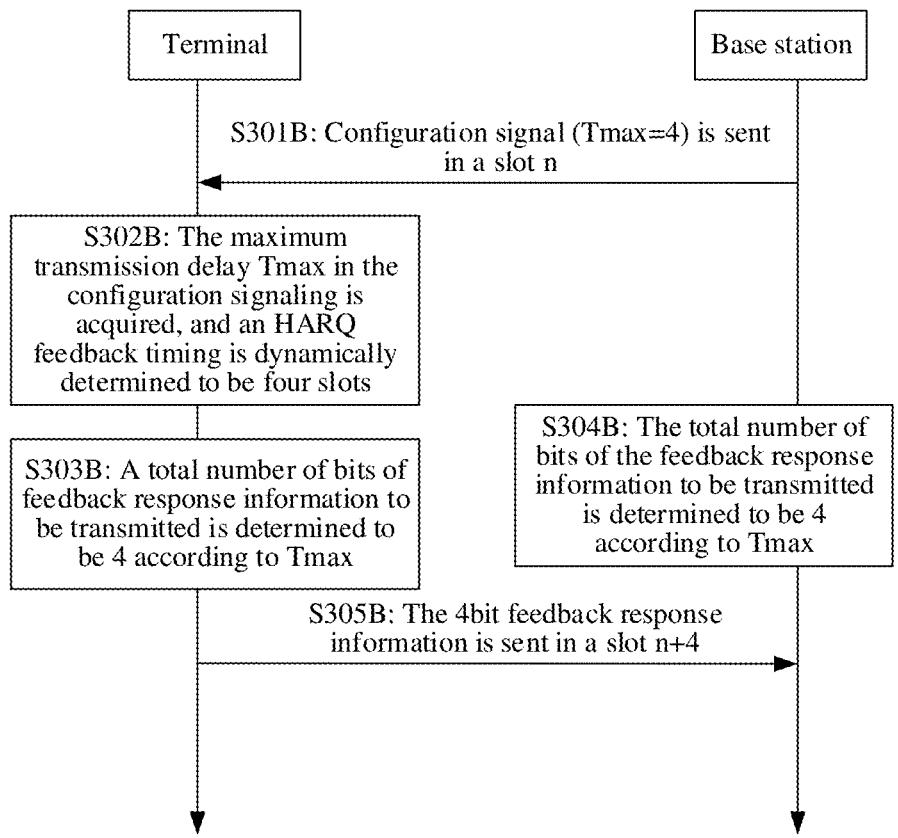
FIG. 3B is a flowchart of a method for determining a length of feedback response information according to another embodiment of the disclosure.

Referring to FIG. 3B, FIG. 3B illustrates a method for determining a length of feedback response information according to a specific implementation mode of the disclosure. A network device in the embodiment is, for example, a base station. The method is executed between a terminal and base station illustrated in FIG. 1. Transmission time units between the terminal and the base station is illustrated in FIG. 3A. As illustrated in FIG. 3B, the method includes the following operations.

In S301B, the base station sends configuration signaling to the terminal in a slot n, and the configuration signaling includes an indication about a maximum transmission delay (four slots) of feedback response information.

In S302B, the terminal acquires the maximum transmission delay in the configuration signaling and dynamically determines an HARQ feedback timing to be four slots.

In S303B, the terminal determines a total number of bits N=2*(4−1−1)=4 of feedback response information to be transmitted according to the formula (2).

In S304B, the base station determines the total number of bits N=2*(4−1−1)=4 of the feedback response information to be transmitted according to the formula (2).

In S305B, the terminal sends the 4 bit feedback response information to the base station in a slot n+4. According to the technical solution of the disclosure, the terminal calculates the total number of bits of the feedback response information and then sends the feedback response information having the total number of bits to the base station, so that multiplexing transmission of feedback response information for the slot n and a slot n+2 in the slot n+4 is implemented.

Figure 3C:
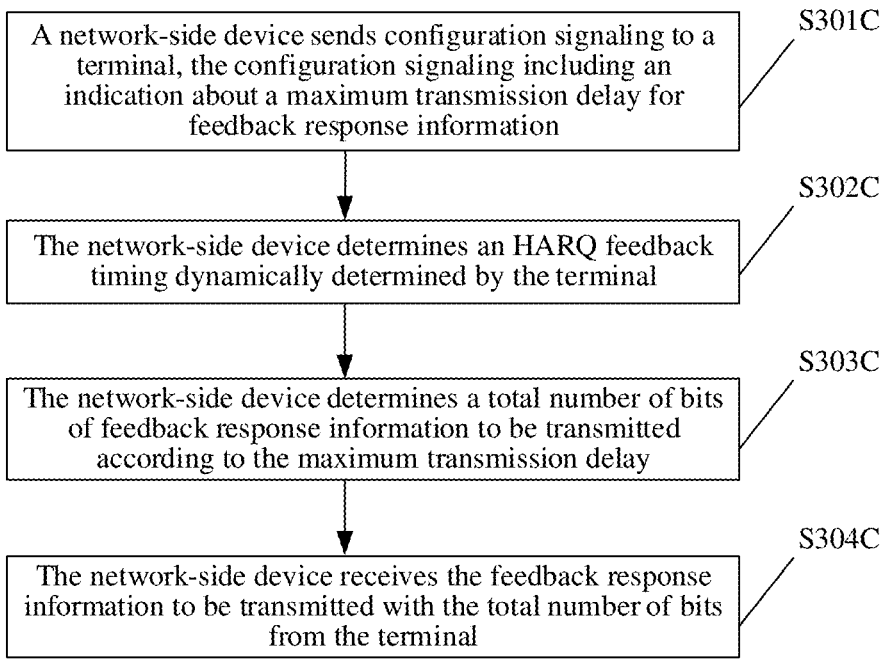
FIG. 3C is a flowchart of another method for determining a length of feedback response information according to another embodiment of the disclosure.

Referring to FIG. 3C, FIG. 3C illustrates another method for determining a length of feedback response information. The method is executed by a network-side device, and the network-side device may be a base station illustrated in FIG. 1 or FIG. 2. As illustrated in FIG. 3C, the method includes the following operations.

In S301C, the network-side device sends configuration signaling to a terminal, and the configuration signaling includes an indication about a maximum transmission delay for feedback response information.

In S302C, the network-side device determines an HARQ feedback timing dynamically determined by the terminal.

In S303C, the network-side device determines a total number of bits of feedback response information to be transmitted according to the maximum transmission delay.

In at least one embodiment, the network-side device determines the total number of bits of the feedback response information to be transmitted according to the maximum transmission delay and a minimum transmission delay.

In at least one embodiment, the network-side device determines the total number of bits of the feedback response information to be transmitted according to a difference between the maximum transmission delay and the minimum transmission delay.

In at least one embodiment, the network-side device determines the total number of bits of the feedback response information to be transmitted according to the maximum transmission delay, the minimum transmission delay and $M_{non-DL}$. $M_{non-DL}$ is a value less than the maximum transmission delay.

In at least one embodiment, the network-side device determines the total number of bits of the feedback response information to be transmitted according to a value obtained by subtracting the minimum transmission delay and $M_{non-DL}$ from the maximum transmission delay, and $M_{non-DL}$ is a value less than the maximum transmission delay.

In S304C, the network-side device receives the feedback response information to be transmitted with the total number of bits from the terminal.

The method of the embodiment illustrated in FIG. 3C supports implementation of the method of the embodiment illustrated in FIG. 3, and thus has the advantage of supporting multiplexing transmission of an ACK/NACK of an NR system in a transmission time unit.

In an optional solution, the total number of bits $N=C^*(T_{max}-T_{min})$.

$T_{max}$ is the maximum transmission delay, $T_{min}$ is a nonnegative integer less than $T_{max}$, and C is a positive integer.

In another optional solution, the total number of bits $N=C^*(T_{max}-T_{min}-M_{non-DL})$.

$T_{max}$ is the maximum transmission delay, $T_{min}$ and $M_{non-DL}$ are nonnegative integers less than $T_{max}$, and C is a positive integer.

In at least one embodiment, in the optional solution or another optional solution, $T_{min}$ is the minimum transmission delay for transmission of feedback response information by the terminal, or $T_{min}$ is a parameter configured by the network-side device.

In at least one embodiment, in the optional solution or the other optional solution, C is a maximum number of bits of feedback response information corresponding to a PDSCH, or C is a set constant, or C is a parameter configured by the network-side device.

In at least one embodiment, in the another optional solution, $M_{non-DL}$ is the number of all first-type time units between a transmission time unit $Y-T_{max}$ and a transmission time unit $Y-T_{min}$. The transmission time unit Y is a time unit for transmission of the feedback response information to be transmitted.

In at least one embodiment, the first-type time unit includes one or any combination of a UL time unit, a time unit when the terminal performs no transmission of a physical shared channel and a time unit when the terminal does not monitor DL control signaling.

In at least one embodiment, the maximum number of bits of the feedback response information corresponding to the PDSCH is: a maximum number of TBs carried in the PDSCH; or a maximum number of CB groups carried in the PDSCH.

In at least one embodiment, the operation that the network-side device receives the feedback response information to be transmitted with the total number of bits from the terminal may include one of the following actions.

The network-side device receives from the terminal the feedback response information subjected to joint coding.

The network-side device receives the feedback response information sent by the terminal through a physical channel.

Figure 4:
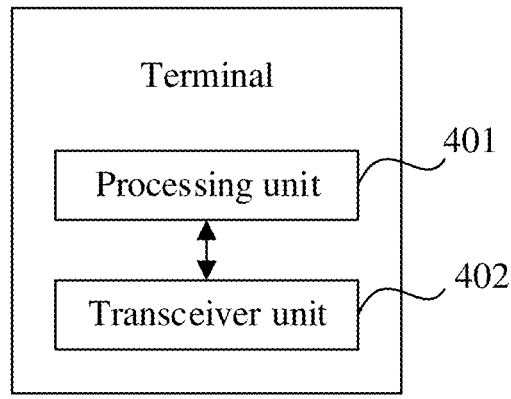
FIG. 4 is a block diagram of functional unit composition of a terminal according to an embodiment of the disclosure.

Referring to FIG. 4, FIG. 4 illustrates a device for determining a length of feedback response information. The device for determining the length of the feedback response information is configured in a terminal. Detailed solutions and technical effects in the embodiment illustrated in FIG. 4 may refer to descriptions in the embodiment illustrated in FIG. 3 or FIG. 3B. The terminal includes a processing unit 401 and a transceiver unit 402 connected with the processing unit 401.

The transceiver unit 402 is configured to receive configuration signaling sent by a network-side device. The configuration signaling includes an indication about a maximum transmission delay for feedback response information.

The processing unit 401 is configured to dynamically determine an HARQ feedback timing and determine a total number of bits of feedback response information to be transmitted according to the maximum transmission delay.

The transceiver unit 402 is configured to send the feedback response information to be transmitted with the total number of bits to the network-side device.

In at least one embodiment, the processing unit 401 is configured to: determine the total number of bits of the feedback response information to be transmitted according to the maximum transmission delay and a minimum transmission delay.

In at least one embodiment, the processing unit 401 is configured to: determine the total number of bits of the feedback response information to be transmitted according to a difference between the maximum transmission delay and the minimum transmission delay.

In at least one embodiment, the processing unit 401 is configured to: determine the total number of bits of the feedback response information to be transmitted according to the maximum transmission delay, the minimum transmission delay and $M_{non-DL}$. $M_{non-DL}$ is a value less than the maximum transmission delay.

In at least one embodiment, the processing unit 401 is configured to: determine the total number of bits of the feedback response information to be transmitted according to a value obtained by subtracting the minimum transmission delay and $M_{non-DL}$ from the maximum transmission delay. $M_{non-DL}$ is a value less than the maximum transmission delay.

In at least one embodiment, the processing unit 401 is specifically configured to determine the total number of bits of the feedback response information to be transmitted according to the maximum transmission delay, and the total number of bits $N=C^*(T_{max}-T_{min})$.

$T_{max}$ is the maximum transmission delay, $T_{min}$ is a nonnegative integer less than $T_{max}$, and C is a positive integer.

In at least one embodiment, the processing unit 401 is specifically configured to determine the total number of bits of the feedback response information to be transmitted according to the maximum transmission delay, and the total number of bits $N=C^*(T_{max}-T_{min}-M_{non-DL})$.

$T_{max}$ is the maximum transmission delay, $T_{min}$ and $M_{non-DL}$ are nonnegative integers less than $T_{max}$, and C is a positive integer.

In at least one embodiment, $T_{min}$ is the minimum transmission delay for transmission of feedback response information by the terminal, or $T_{min}$ is a parameter configured by the network-side device.

In at least one embodiment, $M_{non-DL}$ is the number of all first-type time units between a transmission time unit $Y-T_{max}$ and a transmission time unit $Y-T_{min}$. The transmission time unit Y is a time unit including the feedback response information to be transmitted.

The first-type time unit includes, but not limited to, one or any combination of a UL time unit, a time unit when the terminal performs no transmission of a physical shared channel and a time unit when the terminal does not monitor DL control signaling.

In at least one embodiment, C may specifically be as follows.

C may be a maximum number of bits of feedback response information corresponding to a PDSCH, or C is a set constant, or C is a parameter configured by the network-side device.

Specifically, the maximum number of bits of the feedback response information corresponding to the PDSCH may be a maximum number of TBs carried in the PDSCH, or a maximum number of CB groups carried in the PDSCH.

In at least one embodiment, the transceiver unit 402 is configured to jointly code the feedback response information and send the coded feedback response information. Or the transceiver unit 402 is configured to send the feedback response information through a physical channel.

Figure 4A:
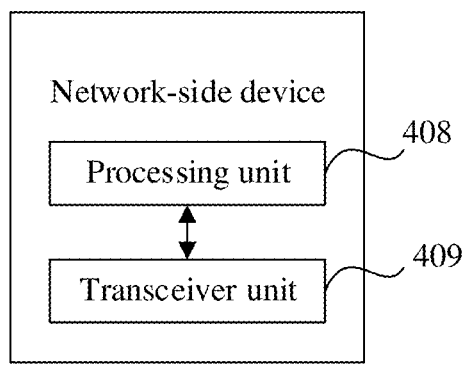
FIG. 4A is a block diagram of functional unit composition of a network device according to an embodiment of the disclosure.

Referring to FIG. 4A, FIG. 4A illustrates a network-side device, which includes a processing unit 408 and a transceiver 409 connected with the processing unit.

The transceiver unit 408 is configured to send configuration signaling to a terminal. The configuration signaling includes an indication about a maximum transmission delay for feedback response information.

The processing unit 409 is configured to determine an HARQ feedback timing dynamically determined by the terminal and determine a total number of bits of feedback response information to be transmitted according to the maximum transmission delay.

The transceiver unit 408 is configured to receive the feedback response information to be transmitted with the total number of bits from the terminal. In the embodiment illustrated in FIG. 4A, a calculation manner for the total number of bits may refer to descriptions in the embodiment illustrated in FIG. 3C, and will not be elaborated herein.

Figure 5:
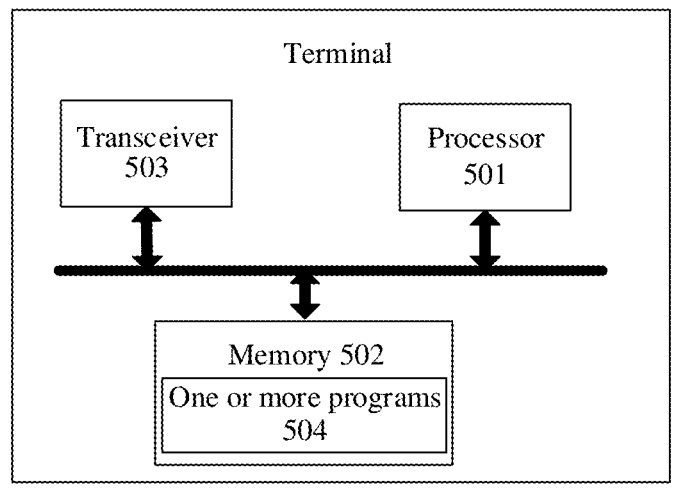
FIG. 5 is a hardware structure diagram of a terminal according to an embodiment of the disclosure.

An embodiment of the disclosure also provides a terminal. As illustrated in FIG. 5, the terminal includes one or more processors 501, a memory 502, a transceiver 503 and one or more programs 504. The one or more programs are stored in the memory 502 and configured to be executed by the one or more processors 501. The programs include instructions configured to execute the operations executed by the terminal in the method provided by the embodiment illustrated in FIG. 3 or FIG. 3B.

Figure 5A:
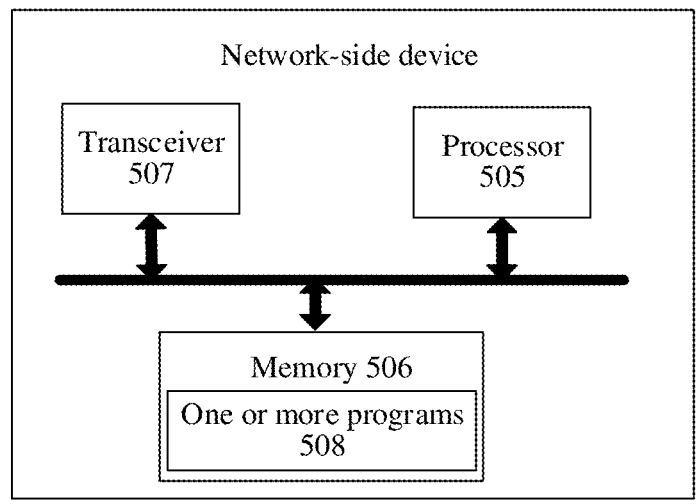
FIG. 5A is a hardware structure diagram of a network device according to an embodiment of the disclosure.

An embodiment of the disclosure also provides a network-side device. As illustrated in FIG. 5A, the network-side device includes one or more processors 505, a memory 506, a transceiver 507 and one or more programs 508. The one or more programs are stored in the memory 506 and configured to be executed by the one or more processors 505. The programs include instructions configured to execute the operations executed by the network device in the method provided by the embodiment illustrated in FIG. 3C or FIG. 3B.

The processor may be a processor or a controller, for example, a Central Processing unit (CPU), a Digital Signal Processor (DSP), an Application Specific Integrated Circuit (ASIC), a Field Programmable Gate Array (FPGA) or another programmable logical device, transistor logical device, hardware component or any combination thereof. The processor may implement or execute various exemplary logical blocks, modules and circuits described in combination with the contents disclosed in the disclosure. The processor may also be a combination for realizing a calculation function, for example, including a combination of one or more microprocessors and a combination of a DSP and a microprocessor. The transceiver 503 may be a communication interface or an antenna.

An embodiment of the disclosure also provides a computer-readable storage medium, which stores a computer program configured for electronic data exchange. The computer program enables a computer to execute the method executed by the terminal in the embodiment illustrated in FIG. 3 or FIG. 3B. Of course, the computer program enables the computer to execute the method executed by the network-side device in the embodiment illustrated in FIG. 3C or FIG. 3B.

An embodiment of the disclosure also provides a computer program product. The computer program product includes a non-transitory computer-readable storage medium storing a computer program. The computer program may be operable to enable a computer to execute the method executed by the terminal in the embodiment illustrated in FIG. 3 or FIG. 3B. Of course, the computer program enables the computer to execute the method executed by the network-side device in the embodiment illustrated in FIG. 3C or FIG. 3B.

The solutions of the embodiments of the disclosure are introduced mainly from the angle of interactions between various network elements. It can be understood that, for realizing the functions, the terminal and the network-side device include corresponding hardware structures and/or software modules executing each function. Those skilled in the art may easily realize that the units and algorithm operations of each example described in combination with the embodiments disclosed in the disclosure may be implemented by hardware or a combination of the hardware and computer software in the disclosure. Whether a certain function is executed by the hardware or in a manner of driving the hardware by the computer software depends on specific applications and design constraints of the technical solutions. Professionals may realize the described functions for each specific application by use of different methods, but such realization shall fall within the scope of the disclosure.

According to the embodiments of the disclosure, functional units of the terminal and the network-side device may be divided according to the abovementioned method examples. For example, each functional unit may be divided correspondingly to each function and two or more than two functions may also be integrated into a processing unit. The integrated unit may be implemented in a hardware form and may also be implemented in form of software program module. It is to be noted that division of the units in the embodiments of the disclosure is schematic and only is a logical function division and another division manner may be adopted during practical implementation.

Figure 6:
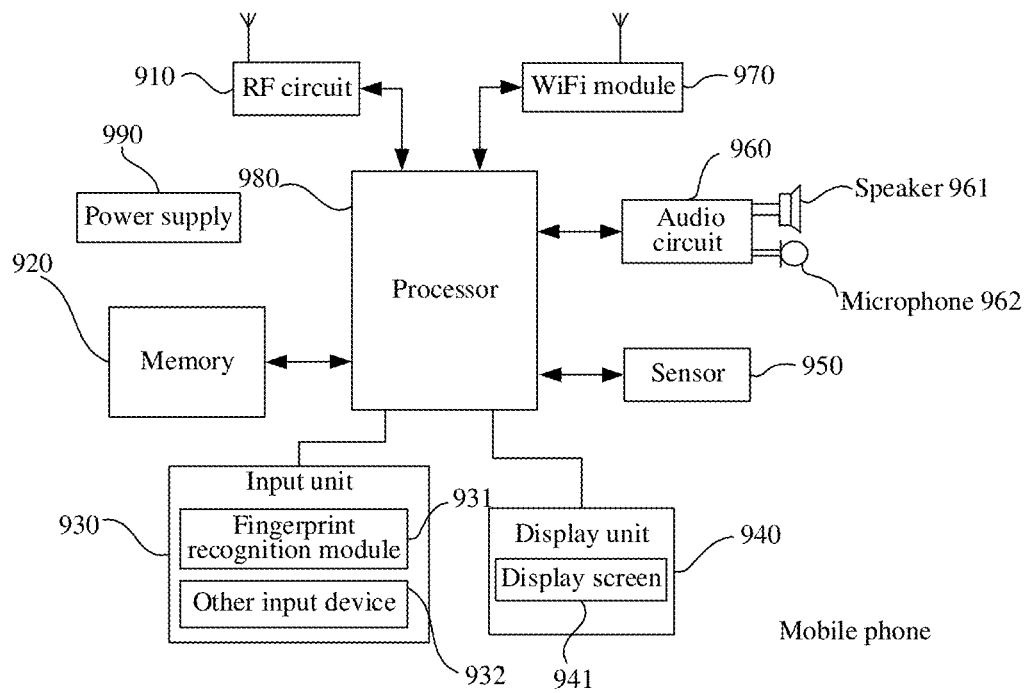
FIG. 6 is a structure diagram of another terminal according to an embodiment of the disclosure.

An embodiment of the disclosure also provides another terminal. As illustrated in FIG. 6, for convenient description, only parts related to the embodiments of the disclosure are illustrated, and specific technical details which are undisclosed refer to parts of the method of the embodiments of the disclosure. The terminal may be any terminal device including a mobile phone, a tablet computer, a Personal Digital Assistant (PDA), a Point of Sales (POS), a vehicle-mounted computer and the like. For example, the terminal is a mobile phone.

FIG. 6 is a block diagram of part structure of a mobile phone related to a terminal according to an embodiment of the disclosure. Referring to FIG. 6, the mobile phone includes components such as a Radio Frequency (RF) circuit 910, a memory 920, an input unit 930, a display unit 940, a sensor 950, an audio circuit 960, a Wireless Fidelity (Wi-Fi) module 970, a processor 980 and a power supply 990. Those skilled in the art should know that the structure of the mobile phone illustrated in FIG. 6 is not intended to limit the mobile phone and may include components more or less than those illustrated in the figure or some components are combined or different component arrangements are adopted.

Each component of the mobile phone will be specifically introduced below in combination with FIG. 6.

The RF circuit 910 may be configured to receive and send information. The RF circuit 910 usually includes, but not limited to, an antenna, at least one amplifier, a transceiver, a coupler, a Low Noise Amplifier (LNA), a duplexer and the like. In addition, the RF circuit 910 may also communicate with a network and another device through wireless communication. The wireless communication may adopt any communication standard or protocol, including, but not limited to, a Global System of Mobile communication (GSM), a General Packet Radio Service (GPRS), Code Division Multiple Access (CDMA), Wideband Code Division Multiple Access (WCDMA), LTE, an electronic mail, Short Messaging Service (SMS) and the like.

The memory 920 may be configured to store a software program and a module. The processor 980 operates the software program and module stored in the memory 920, thereby executing various function applications and data processing of the mobile phone. The memory 920 may mainly include a program storage region and a data storage region. The program storage region may store an operating system, an application program required by at least one function and the like. The data storage region may store data created according to use of the mobile phone and the like. In addition, the memory 920 may include a high-speed Random Access Memory (RAM) and may further include a nonvolatile memory, for example, at least one disk storage device, flash memory device or other volatile solid-state storage device.

The input unit 930 may be configured to receive input digital or character information and generate key signal input related to user setting and function control of the mobile phone. Specifically, the input unit 930 may include a fingerprint recognition module 931 and another input device 932. The fingerprint recognition module 931 may acquire fingerprint data of a user thereon. Besides the fingerprint recognition module 931, the input unit 930 may further include the other input device 932. Specifically, the other input device 932 may include, but not limited to, one or more of a touch screen, a physical keyboard, a function key (for example, a volume control button and a switch button), a trackball, a mouse, a stick and the like.

The display unit 940 may be configured to display information input by the user or information provided for the user and various menus of the mobile phone. The display unit 940 may include a display screen 941. In at least one embodiment, the display screen 941 may be configured in form of Liquid Crystal Display (LCD) and Organic Light-Emitting Diode (OLED). In FIG. 6, the fingerprint recognition module 931 and the display screen 941 realize input and output functions of the mobile phone as two independent components. However, in some embodiments, the fingerprint recognition module 931 and the display screen 941 may be integrated to realize the input and play functions of the mobile phone.

The mobile phone may further include at least one sensor 950, for example, a light sensor, a motion sensor and another sensor. Specifically, the light sensor may include an environmental light sensor and a proximity sensor. The environmental light sensor may regulate brightness of the display screen 941 according to brightness of environmental light, and the proximity sensor may turn off the display screen 941 and/or backlight when the mobile phone is moved to an ear.

An accelerometer sensor as a motion sensor may detect a magnitude of an acceleration in each direction (usually three axes), may detect a magnitude and direction of the gravity under a static condition, and may be configured for an application recognizing a posture of the mobile phone (for example, landscape and portrait switching, a related game and magnetometer posture calibration), a function related to vibration recognition and the like (for example, a pedometer and knocking). Other sensors, for example, a gyroscope, a barometer, a hygrometer, a thermometer and an infrared sensor, which may be configured in the mobile phone, will not be elaborated herein.

The audio circuit 960, a speaker 961, and a microphone 962 may provide audio interfaces between the user and the mobile phone. The audio circuit 960 may transmit an electric signal obtained by converting received audio data to the speaker 961, and the speaker 961 converts the electric signal into a sound signal for playing. On the other hand, the microphone 962 converts a collected sound signal into an electric signal, the audio circuit 960 receives and converts the electric signal into audio data, and the audio data is processed by the playing processor 980 and sent to, for example, another mobile phone through the RF circuit 910, or the audio data is played to the memory 920 for further processing.

Wi-Fi belongs to a short-distance wireless transmission technology. The mobile phone may help the user through the Wi-Fi module 970 to receive and send an electronic mail, browse a webpage, access streaming media and the like, and wireless wideband Internet access is provided for the user. Although the Wi-Fi module 970 is illustrated in FIG. 6, it can be understood that it is not a necessary composition of the mobile phone and may completely be omitted according to a requirement without changing the scope of the essence of the disclosure.

The processor 980 is a control center of the mobile phone, connects each part of the whole mobile phone by use of various interfaces and lines and executes various functions and data processing of the mobile phone by running or executing the software program and/or module stored in the memory 920 and calling data stored in the memory 920, thereby monitoring the whole mobile phone. In at least one embodiment, the processor 980 may include one or more processing units. The processor 980 may integrate an application processor and a modulation and demodulation processor. The application processor mainly processes the operating system, a user interface, an application program and the like. The modulation and demodulation processor mainly processes wireless communication. It can be understood that the modulation and demodulation processor may also not be integrated into the processor 980.

The mobile phone further includes the power supply 990 (e.g., battery) supplying power to each part (for example, a battery). The power supply may be logically connected with the processor 980 through a power management system, thereby realizing functions of charging and discharging management, power consumption management and the like through the power management system.

Although not illustrated in the figure, the mobile phone may further include a camera, a Bluetooth module and the like, which will not be elaborated herein.

In the embodiment illustrated in FIG. 3 or FIG. 3B, the flow on a terminal side in each method may be implemented on the basis of the structure of the mobile phone.

In the embodiment illustrated in FIG. 4 or FIG. 5, each functional unit may be implemented on the basis of the structure of the mobile phone.

The operations of the method or algorithm described in the embodiments of the disclosure may be implemented in a hardware manner, and may also be implemented in a manner of executing, by a processor, software. A software instruction may consist of a corresponding software module, and the software module may be stored in an RAM, a flash memory, a Read Only Memory (ROM), an Erasable Programmable ROM (EPROM), an Electrically EPROM (EEPROM), a register, a hard disk, a mobile hard disk, a Compact Disc-ROM (CD-ROM) or a storage medium in any other form well known in the field. An exemplary storage medium is coupled to the processor, thereby enabling the processor to read information from the storage medium and write information into the storage medium. The storage medium may also be a component of the processor. The processor and the storage medium may be located in an ASIC. In addition, the ASIC may be located in an access network device, a target network device or a core network device. Of course, the processor and the storage medium may also exist in the access network device, the target network device or the core network device as discrete components.

Those skilled in the art may realize that, in one or more abovementioned examples, all or part of the functions described in the embodiments of the disclosure may be realized through software, hardware or any combination thereof. During implementation with the software, the embodiments may be implemented completely or partially in form of computer program product. The computer program product includes one or more computer instructions. When the computer program instruction is loaded and executed on a computer, the flows or functions according to the embodiments of the disclosure are completely or partially generated. The computer may be a universal computer, a dedicated computer, a computer network or another programmable device. The computer instruction may be stored in a computer-readable storage medium or transmitted from one computer-readable storage medium to another computer-readable storage medium. For example, the computer instruction may be transmitted from a website, computer, server or data center to another website, computer, server or data center in a wired (for example, coaxial cable, optical fiber and Digital Subscriber Line (DSL)) or wireless (for example, infrared, wireless and microwave) manner. The computer-readable storage medium may be any available medium accessible for the computer or a data storage device including such as a server and a data center integrated by one or more available media. The available medium may be a magnetic medium (for example, a floppy disk, a hard disk and a magnetic tape), an optical medium (for example, a Digital Video Disc (DVD)), a semiconductor medium (for example, a Solid State Disk (SSD)) or the like.

The abovementioned specific implementation modes further describe the purposes, technical solutions and beneficial effects of the embodiments of the disclosure in detail. It is to be understood that the above is only the specific implementation mode of the embodiments of the disclosure and not intended to limit the scope of protection of the embodiments of the disclosure. Any modifications, equivalent replacements, improvements and the like made on the basis of the technical solutions of the embodiments of the disclosure shall fall within the scope of protection of the embodiments of the disclosure.

The invention claimed is:

1. A method for determining a length of feedback response information, comprising:
receiving, by a terminal, configuration signaling sent by a network-side device, the configuration signaling comprising an indication about a maximum transmission timing value for feedback response information;
dynamically determining, by the terminal, a hybrid automatic repeat request (HARQ) feedback timing;
determining, by the terminal, a total number of bits of feedback response information to be transmitted according to the maximum transmission timing value, a minimum transmission timing value and $M_{non-DL}$, wherein $M_{non-DL}$ is a value less than the maximum transmission timing value, wherein $M_{non-DL}$ is a number of all first-type time units between a transmission time unit $Y-T_{max}$ and a transmission time unit $Y-T_{min}$, a transmission time unit Y being a time unit for transmission of the feedback response information to be transmitted, wherein the first-type time units comprise at least one of an uplink (UL) time unit, a time unit when the terminal performs no transmission of a physical shared channel, or a time unit when the terminal does not monitor downlink (DL) control signaling; and
sending, by the terminal to the network-side device, the feedback response information to be transmitted with the total number of bits.

2. The method of claim 1, wherein determining, by the terminal, the total number of bits of the feedback response information to be transmitted according to the maximum transmission timing value comprises:
determining, by the terminal, the total number of bits of the feedback response information to be transmitted according to the maximum transmission timing value and a minimum transmission timing value.

3. The method of claim 1, wherein determining, by the terminal, the total number of bits of the feedback response information to be transmitted according to the maximum transmission timing value comprises:
determining, by the terminal, the total number of bits of the feedback response information to be transmitted according to a difference between the maximum transmission timing value and a minimum transmission timing value.

4. The method of claim 1, wherein sending, by the terminal to the network-side device, the feedback response information to be transmitted with the total number of bits comprises:
jointly coding, by the terminal, the feedback response information and sending the coded feedback response information; or
sending, by the terminal, the feedback response information through a physical channel.

5. A terminal, comprising:
a processor; and
a transceiver connected with the processor, wherein
the transceiver is configured to receive configuration signaling sent by a network-side device, the configuration signaling comprising an indication about a maximum transmission timing value for feedback response information;
wherein the processor is configured to dynamically determine a hybrid automatic repeat request (HARQ) feedback timing and determine a total number of bits of feedback response information to be transmitted according to the maximum transmission timing value, a minimum transmission timing value and $M_{non-DL}$, wherein $M_{non-DL}$ is a value less than the maximum transmission timing value, wherein $M_{non-DL}$ is a number of all first-type time units between a transmission time unit $Y-T_{max}$ and a transmission time unit $Y-T_{min}$, a transmission time unit Y being a time unit for transmission of the feedback response information to be transmitted, wherein the first-type time units comprise at least one of an uplink (UL) time unit, a time unit when the terminal performs no transmission of a physical shared channel, or a time unit when the terminal does not monitor downlink (DL) control signaling; and the transceiver is configured to send the feedback response information to be transmitted with the total number of bits to the network-side device.

6. The terminal of claim 5, wherein the processor is configured to:

determine the total number of bits of the feedback response information to be transmitted according to the maximum transmission timing value and a minimum transmission timing value.

7. The terminal of claim 5, wherein the processor is configured to:

determine the total number of bits of the feedback response information to be transmitted according to a difference between the maximum transmission timing value and a minimum transmission timing value.

8. The terminal of claim 5, wherein the total number of bits $N=C^*(T_{max}-T_{min})$, where $T_{max}$ is the maximum transmission timing value, $T_{min}$ is a nonnegative integer less than $T_{max}$, and C is a positive integer.

9. The terminal of claim 8, wherein $T_{min}$ is the minimum transmission timing value for feedback response information transmission of the terminal; or $T_{min}$ is a parameter configured by the network-side device.

10. The terminal of claim 8, wherein

C is a maximum number of bits of feedback response information corresponding to a physical downlink shared channel (PDSCH); or C is a set constant; or C is a parameter configured by the network-side device.

11. The terminal of claim 10, wherein the maximum number of bits of the feedback response information corresponding to the PDSCH is:

a maximum number of transport blocks (TBs) carried in the PDSCH; or a maximum number of code block (CB) groups carried in the PDSCH.

12. The terminal of claim 5, wherein the processor is configured to:

determine the total number of bits of the feedback response information to be transmitted according to a value obtained by subtracting a minimum transmission timing value and $M_{non-DL}$ from the maximum transmission timing value, $M_{non-DL}$ being a value less than the maximum transmission timing value.

13. The terminal of claim 5, wherein the total number of bits $N=C^*(T_{max}-T_{min}-M_{non-DL})$, where $T_{max}$ is the maximum transmission timing value, $T_{min}$ and $M_{non-DL}$ are nonnegative integers less than $T_{max}$, and C is a positive integer.

14. The terminal of claim 5, wherein the transceiver is configured to jointly code the feedback response information and send the coded feedback response information; or the transceiver is configured to send the feedback response information through a physical channel.

15. A network-side device, comprising:

a processor; and a transceiver connected with the processor, wherein the transceiver is configured to send configuration signaling to a terminal, the configuration signaling comprising an indication about a maximum transmission timing value for feedback response information;

wherein the processor is configured to determine a hybrid automatic repeat request (HARQ) feedback timing dynamically determined by the terminal and determine a total number of bits of feedback response information to be transmitted according to the maximum transmission timing value, a minimum transmission timing value and $M_{non-DL}$ wherein $M_{non-DL}$ is a value less than the maximum transmission timing value, wherein $M_{non-DL}$ is a number of all first-type time units between a transmission time unit $Y-T_{max}$ and a transmission time unit $Y-T_{min}$, a transmission time unit Y being a time unit for transmission of the feedback response information to be transmitted, wherein the first-type time units comprise at least one of an uplink (UL) time unit, a time unit when the terminal performs no transmission of a physical shared channel, or a time unit when the terminal does not monitor downlink (DL) control signaling; and the transceiver is configured to receive the feedback response information to be transmitted with the total number of bits from the terminal.

16. The network-side device of claim 15, wherein the processor is configured to:

determine the total number of bits of the feedback response information to be transmitted according to the maximum transmission timing value and a minimum transmission timing value.

17. The network-side device of claim 15, wherein the processor is configured to:

determine the total number of bits of the feedback response information to be transmitted according to a difference between the maximum transmission timing value and a minimum transmission timing value.

\* \* \* \* \*